United States Patent
Toda et al.

(10) Patent No.: US 9,583,248 B2
(45) Date of Patent: Feb. 28, 2017

(54) SOLENOID AND HYDRAULIC PRESSURE CONTROL APPARATUS HAVING THE SAME

(71) Applicants: DENSO CORPORATION, Kariya, Aichi-pref. (JP); NIPPON SOKEN, INC., Nishio, Aichi-pref. (JP); HAMANAKODENSO CO., LTD., Kosai, Shizuoka-pref. (JP)

(72) Inventors: Shota Toda, Nishio (JP); Shuhei Oe, Nukata-gun (JP); Shoji Isogai, Kariya (JP); Motoyoshi Ando, Nagoya (JP); Takao Ishida, Toyohashi (JP); Kengo Suzuki, Hamamatsu (JP)

(73) Assignees: DENSO CORPORATION, Kariya (JP); NIPPON SOKEN, INC., Nishio (JP); HAMANAKODENSO CO., LTD., Kosai (JP)

( * ) Notice: Subject to any disclaimer, the term of this patent is extended or adjusted under 35 U.S.C. 154(b) by 162 days.

(21) Appl. No.: 14/669,381

(22) Filed: Mar. 26, 2015

(65) Prior Publication Data
US 2015/0279538 A1 Oct. 1, 2015

(30) Foreign Application Priority Data
Mar. 28, 2014 (JP) .................................. 2014-69780

(51) Int. Cl.
| F16H 61/00 | (2006.01) |
|---|---|
| H01F 7/121 | (2006.01) |
| H01F 7/16 | (2006.01) |
| H01F 7/08 | (2006.01) |
| F16K 31/06 | (2006.01) |

(52) U.S. Cl.
CPC ......... *H01F 7/121* (2013.01); *F16H 61/0009* (2013.01); *F16H 61/0021* (2013.01); *F16K 31/0665* (2013.01); *H01F 7/081* (2013.01); *H01F 7/1607* (2013.01); *H01F 2007/083* (2013.01)

(58) Field of Classification Search
CPC .................................................. F16H 61/0009
See application file for complete search history.

(56) References Cited

U.S. PATENT DOCUMENTS

2008/0204176 A1* 8/2008 Sriraksat ............... H01F 7/1827
335/234

FOREIGN PATENT DOCUMENTS

| JP | 01150083 | * 6/1989 | ............. F16K 31/06 |
| JP | 4093092 | 3/2008 | |
| JP | 2009-180261 | 8/2009 | |

OTHER PUBLICATIONS

U.S. Appl. No. 14/633,540, M. Ando et al., filed Feb. 27, 2015 (15 pages).

* cited by examiner

*Primary Examiner* — Tisha Lewis
(74) *Attorney, Agent, or Firm* — Nixon & Vanderhye P.C.

(57) ABSTRACT

In a solenoid of a hydraulic pressure control apparatus, a region adjacent to an oil flow guide portion of a stopper breathing passage is formed in a magnetism application region, through which a leakage magnetic flux leaking from a magnetic circuit at a time of turning on of a coil passes. Thereby, magnetic foreign objects made of iron or iron containing material are magnetically attracted to the leakage magnetic flux, so that intrusion of the foreign objects from an outside of the solenoid into a second volume variable chamber through the stopper breathing passage is limited.

16 Claims, 5 Drawing Sheets

SOLENOID AND HYDRAULIC PRESSURE CONTROL APPARATUS HAVING THE SAME

CROSS REFERENCE TO RELATED APPLICATION

This application is based on and incorporates herein by reference Japanese Patent Application No. 2014-69780 filed on Mar. 28, 2014.

TECHNICAL FIELD

The present disclosure relates to a solenoid and a hydraulic pressure control apparatus having the same.

BACKGROUND

A previously known hydraulic pressure control apparatus of an automatic transmission includes an oil pan, which stores oil, a valve body, which includes a plurality of oil flow passages, and a solenoid valve (an electromagnetic valve), which forms a hydraulic circuit in cooperation with the oil flow passages of the valve body.

The electromagnetic valve is immersed together with the valve body into the oil received in the oil pan and includes valve elements (e.g., a spool valve and a ball valve) and a solenoid actuator (hereinafter referred to as a solenoid), which drives the valve elements (see for example, JP2009-180261A).

The solenoid includes a plunger, a coil, a stator core, a yoke and a connector. The plunger is driven in an axial direction by a magnetic force. The coil generates a magnetic flux around the coil when the coil is energized. The stator is configured into a tubular body and forms a magnetic path on a radially inner side of the coil. The yoke is configured into a tubular body having a bottom and forms a magnetic path on a radially outer side of the coil. The connector is for establishing an external connection and connects the coil to an external circuit(s).

The solenoid magnetically attracts the plunger to a magnetically attracting portion of the stator core with the magnetic force generated from the coil to drive the valve element in the axial direction.

JP2009-180261A discloses an electromagnetic valve, which includes a solenoid of a ring core type where a plunger directly slides in a guide hole of a stator core that is magnetized together with the plunger and the yoke by a magnetic force generated from a coil.

In order to limit sticking of the plunger caused by a volume change (breathing action) at a plunger receiving chamber that receives the plunger in a manner that enables reciprocation of the plunger at the time of operating the solenoid, a breathing passage is formed in the electromagnetic valve of JP2009-180261A. The breathing passage extends from an outside communication opening, which is communicated with an outside of the solenoid, to an inside communication opening, which is communicated with the plunger receiving chamber, to provide an oil supply path from the outside of the solenoid to the plunger receiving chamber.

The plunger receiving chamber includes two spaces, which are located on two opposite sides, respectively, of the plunger (i.e., a plunger front side space, which will be referred to as a first volume variable chamber, and a plunger back side space, which will be referred to as a second volume variable chamber).

In the solenoid of JP2009-180261A, foreign objects, which are contained in hydraulic fluid (oil) that inflows into and outflows from the second volume variable chamber through the breathing passage in response to a change in the volume of the second volume variable chamber, sink to a lower side in the breathing passage in the direction of the gravitational force at the time of reciprocating the foreign objects contained in the hydraulic fluid in the breathing passage, so that a majority of the foreign objects is removed from the oil that enters a distal end fluid chamber, and thereby intrusion of the foreign objects into the distal end fluid chamber is limited.

Foreign objects, such as metal debris particles (magnetic foreign objects made of iron or iron containing material, or contaminants) generated by, for example, friction of a transmission mechanism (a speed change mechanism) of an automatic transmission, are mixed in the oil, into which the electromagnetic valve is immersed together with the valve body. In a case where these foreign objects inflow along with the oil into the inside of the plunger receiving chamber through the breathing passage, when the foreign object(s) is caught in a slide clearance between the plunger and the stator core, smooth movement of the plunger relative to the stator core is interfered. Therefore, malfunction of the plunger may possibly occur.

Furthermore, in the solenoid of JP2009-180261A, a settling velocity (a sinking speed) of the minute foreign objects is slow. Therefore, when the plunger is moved before the minute foreign objects are settled, the minute foreign objects may possibly enter the second volume variable chamber.

In the case where the minute foreign objects enter the second volume variable chamber, the minute foreign object(s) may possibly be caught at a slide part (a slide clearance) between the outer peripheral surface of the plunger and the hole wall surface of the guide hole of the stator core.

When the minute foreign object(s) is caught in the slide clearance, smooth reciprocating movement of the plunger relative to the guide hole of the stator core may be interfered, so that an inoperable state (valve locked state) or a malfunctioning state of the plunger and a shaft connected to the plunger may possibly occur.

SUMMARY

The present disclosure addresses the above disadvantage.

According to the present disclosure, there is provided a solenoid that includes a plunger, a stator, a coil, and a stopper. The plunger is reciprocatable in an axial direction. The stator includes a core, a plunger guide and a plunger receiving chamber. The core is opposed to the plunger in the axial direction and is spaced from the plunger by a predetermined distance. The plunger guide is configured into a tubular form and is placed adjacent to the core. The plunger guide reciprocatably and slidably supports the plunger. The plunger receiving chamber is placed on a radially inner side of the plunger guide and reciprocatably and slidably receives the plunger. The coil generates a magnetic flux, which flows through the plunger and the stator, when the coil is energized. The stopper is opposed to the core in the axial direction while the plunger receiving chamber is interposed between the stopper and the core. The stopper limits movement of the plunger toward a side in the axial direction. A magnetic circuit, which includes the plunger and the stator, is formed to magnetically attract the plunger toward the core when the coil is energized. The plunger receiving chamber includes a volume variable chamber that is formed between the plunger and the stopper. The stopper includes a partition wall and a breathing passage. The partition wall partitions between an inside and an outside of the volume variable chamber. The breathing passage extends through the partition wall and communicates between the inside and the outside of the volume variable chamber. A region adjacent to the breathing passage or at least a portion of the breathing passage is formed in a magnetism application region, wherein a leakage magnetic flux, which is leaked from the magnetic circuit, passes through the magnetism application region.

According to the present disclosure, there is also provided a hydraulic pressure control apparatus that includes an oil pan, a valve body and a plurality of solenoid valves. The oil pan stores oil used in an automatic transmission. The valve body is placed in an inside of the oil pan and includes a plurality of flow passages. The plurality of solenoid valves forms a hydraulic circuit in cooperation with the plurality of flow passages of the valve body. At least one of the plurality of solenoid valves includes the solenoid discussed above.

BRIEF DESCRIPTION OF THE DRAWINGS

The drawings described herein are for illustration purposes only and are not intended to limit the scope of the present disclosure in any way.

DETAILED DESCRIPTION

Figure 1:
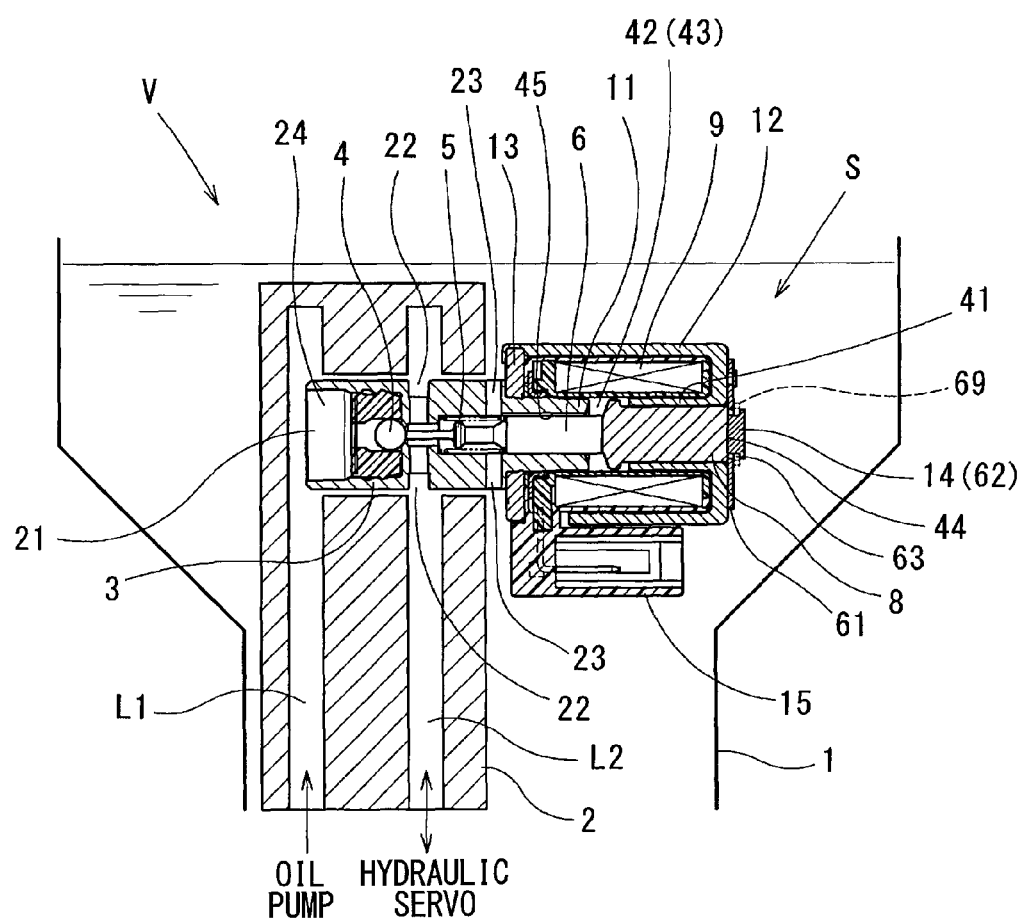
FIG. 1 is a schematic diagram indicating a state where a solenoid valve is placed in an inside of an oil pan of an automatic transmission according to a first embodiment of the present disclosure.

Various embodiments of the present disclosure will be described with reference to the accompanying drawings.

First Embodiment

FIGS. 1 to 3B show a solenoid valve, which includes a solenoid (i.e., a solenoid actuator), according to a first embodiment of the present disclosure.

The solenoid valve (also referred to as an electromagnetic hydraulic pressure control valve, an electromagnetic control valve, or an electromagnetic valve) of the present disclosure is installed in a hydraulic pressure control apparatus of an automatic transmission.

The hydraulic pressure control apparatus is used in, for example, a speed change control operation of the automatic transmission installed in a vehicle (e.g., an automobile). The hydraulic pressure control apparatus includes an oil pump (not shown), a valve body 2, a plurality of solenoid valves, and a control unit (an electronic control unit, more specifically a transmission control unit (TCU)). The oil pump draws oil, which is stored in an oil storage chamber of an oil pan 1 of the hydraulic pressure control apparatus, and the oil pump pressurizes the drawn oil and discharges the pressurized oil. The valve body 2 is placed in an inside of the oil storage chamber of the oil pan 1 and includes a plurality of oil passages (flow passages). The solenoid valves are installed to the valve body 2 and form a hydraulic circuit in cooperation with the oil passages of the valve body 2. The control unit controls energization of the solenoid valves to implement a demanded operational state of the transmission, which is demanded from, for example, a driver of the vehicle.

The oil pan 1 is a storage container, which has the oil storage chamber that stores the hydraulic fluid (oil) used in the automatic transmission. The oil pan 1 is installed to a lower part of an automatic transmission case. An oil tank may be used in place of the oil pan 1.

A torque converter and a transmission mechanism (a speed change mechanism) are received in the automatic transmission case. The torque converter includes a pump, a turbine and a stator. The transmission mechanism is of a multi-stage gear type and is connected to the turbine of the torque converter. The transmission mechanism includes a plurality of friction engaging elements (a clutch or a brake), which are engaged with each other or are released from each other in response to a hydraulic pressure (an oil pressure) supplied from the hydraulic pressure control apparatus.

A shift range is changed in the automatic transmission according to a combination of the coupling or decoupling of each corresponding ones of the friction engaging elements. In this way, the speed change control operation of the automatic transmission is performed.

A plurality of oil supply flow passages (oil passages L1) connected to an outlet of the oil pump is formed in the valve body 2. The solenoid valves are installed to downstream ends, respectively, of the oil passages L1. Furthermore, a plurality of oil supply flow passages (oil passages L2) is formed in the valve body 2. Each of the oil supply flow passages (oil passages L2) connects between an output of a corresponding one of the solenoid valves and an oil supply destination or a hydraulic servo of the clutch (or the brake) of the automatic transmission.

The solenoid valves are immersed together with the valve body 2 into the oil. These solenoid valves include a linear solenoid valve and an on/off solenoid valve. The linear solenoid valve adjusts a hydraulic pressure of the oil and outputs the adjusted hydraulic pressure of the oil to the hydraulic servo of the clutch (or the brake). The on/off solenoid valve outputs a drive pressure signal to a relay valve that changes a supply destination of the oil.

At least one of the solenoid valves has a hydraulic control valve unit (hereinafter referred to as a hydraulic pressure control valve V) and an electromagnetic actuator (hereinafter referred to as a solenoid S). The hydraulic pressure control valve V adjusts a hydraulic pressure of the hydraulic fluid (oil), which is pressure fluid, and outputs the adjusted hydraulic pressure of the hydraulic fluid. The solenoid S drives a ball valve 4 and a bleed valve 5 (first and second valve elements) and a valve shaft 6 (a common valve shaft or simply referred to as a shaft) of the hydraulic pressure control valve V toward one side (a distal end side) in the axial direction thereof.

The hydraulic pressure control valve V includes a valve sleeve (a valve housing that will be hereinafter referred to as housing 3), the ball valve 4, the bleed valve 5 (the first and second valve elements), the valve shaft 6, and a return spring 7. The housing 3 is configured into a cylindrical tubular body and is fitted in a valve insertion groove (recess) of the valve body 2. The ball valve 4 and the bleed valve 5 are reciprocatably received in an inside of the housing 3. The valve shaft 6 is reciprocatably and slidably received in an axial hole (an inner hole) that extends linearly in the axial direction of the housing 3, and the valve shaft 6 is movable integrally with the ball valve 4 and the bleed valve 5. The return spring 7 urges the ball valve 4, the bleed valve 5 and the valve shaft 6 toward a base end side (solenoid side), which is opposite from the one side (the distal end side) in the axial direction of the housing 3.

The solenoid S includes a movable body (hereinafter referred to as a plunger 8), a solenoid coil (hereinafter referred to as a coil 9), a stator (a stator core 11, a yoke 12 and a ring core 13), a stopper plate 14, and a connector 15. The plunger 8 is made of a magnetic material and is connected to the ball valve 4 and the bleed valve 5 through the valve shaft 6 made of a non-magnetic material in such a manner that the plunger 8 is movable integrally with the ball valve 4 and the bleed valve 5 through the valve shaft 6. The coil 9 generates a magnetic flux around the coil 9 when the coil 9 is energized. The stator is made of a magnetic material and forms a magnetic path on a radially inner side of the coil 9 and a magnetic path on a radially outer side of the coil 9. The stopper plate 14 limits movement of the plunger 8 toward the base end side, which is opposite from the one side (the distal end side) in the axial direction of the plunger 8. The connector 15 is for establishing an external connection and connects the coil 9 to an external circuit(s) (e.g., an external electric power source and the external control circuit such as the TCU).

Details of the solenoid S will be described later.

As discussed above, the hydraulic pressure control valve V includes the housing 3, the ball valve 4, the bleed valve 5, the valve shaft 6 and the return spring 7.

The housing 3 has the function of the stator core 11 at the base end side in the axial direction, that is, the housing 3 forms the stator core 11. The housing 3 is configured into the cylindrical tubular body and is made of magnetic metal (e.g., a ferromagnetic material, such as iron) that is magnetically excited (magnetized) when the coil 9 is energized. The axial hole, which extends linearly in the axial direction, is formed in the inside of the housing 3. This axial hole includes a shaft guide hole (hereinafter referred to as a guide hole 16), which has a relatively large inner diameter in the axial hole. The guide hole 16 is formed as a slide hole, along which the valve shaft 6 directly slides. That is, the guide hole 16, which has a circular cross section, is formed in an inside (a radially inner side) of the housing 3, and an outer peripheral surface (a slide surface) of the valve shaft 6 directly slides along the guide hole 16.

The housing 3 surrounds the axial hole in a circumferential direction. The housing 3 includes a cylindrical outer peripheral wall 18 and a cylindrical outer peripheral wall 17, which linearly extend in the axial direction from the base end side (the solenoid side) to the distal end side (the input port side) of the housing 3. The axial hole, which has a circular cross section, is formed in an inside of the outer peripheral walls 17, 18.

The outer peripheral wall 17 is a large diameter peripheral wall, which is inserted into the valve insertion groove of the valve body 2, and an outer diameter of the outer peripheral wall 17 is larger than an outer diameter of the outer peripheral wall 18. Furthermore, the outer peripheral wall 18 is a small diameter peripheral wall, which projects from an outer surface of the valve body 2 toward the oil received in the oil storage chamber of the oil pan 1, and an outer diameter of the outer peripheral wall 18 is smaller than an outer diameter of the outer peripheral wall 17. An annular step (an annular surface) 19 is formed between the outer peripheral wall 17 and the outer peripheral wall 18 to position the ring core 13.

Oil supply and discharge ports, through which the oil inflows into or outflows from the housing 3, communicate between the inner side and the outer side of the outer peripheral wall 17 of the housing 3. These oil supply and discharge ports communicate between the outer peripheral surface (the outside) of the housing 3 and the inside of the axial hole.

The oil supply and discharge ports include one input port 21, a plurality (two to four or at least two) of output ports 22 and a plurality (two to four or at least two) of drain ports (discharge ports) 23.

The input port 21 is an IN port (an oil supply port), which supplies an input pressure of the oil into the inside of the axial hole (an input chamber 24). The input port 21 communicates between the oil passage L1 and the input chamber 24 in a direction, which is the same direction as the axial direction of the axial hole.

The output ports 22 are OUT ports, through which a predetermined output pressure of the oil is outputted from the inside of the axial hole (a first valve hole 25) to the hydraulic servo of the clutch (or the brake) through the oil passage L2 after the input pressure of the oil is adjusted to the predetermined output pressure. The output ports 22 communicate between the inside of the axial hole and the oil passage L2 in a radial direction that is substantially perpendicular to the axial direction of the axial hole.

The drain ports 23 are DRAIN ports that directly output the oil from an inside of a drain chamber 27 to the oil storage chamber of the oil pan 1 upon supply of the oil from the input port 21 or the output ports 22 into the inside of the axial hole (a second valve hole 26 and the drain chamber 27).

A first valve seat (hereinafter referred to as a valve seat 32), which is configured into an annular shape, is formed integrally in a center part of a partition wall 31, which is configured into an annular shape and forms a peripheral edge part of the first valve hole 25. The ball valve 4 is seated against the valve seat 32 when the energization of the coil 9 is stopped (the energization of the coil 9 is turned off), i.e., when the amount of lift of the ball valve 4 is zero. A conical surface, which is configured into a truncated cone shape, is formed in the valve seat 32 such that a hole inner diameter of the conical surface progressively decreases from an edge line of the partition wall 31 toward the solenoid S.

A second valve seat (hereinafter referred to as a valve seat 34), which is configured into an annular shape, is formed integrally in a center part of a partition wall 33, which is configured into an annular shape and forms a peripheral edge part of the second valve hole 26. The bleed valve 5 is seated against the valve seat 34 when the coil 9 is energized (the energization of the coil 9 is turned on), particularly when the ball valve 4 is in a full lift state (i.e., a state where the ball valve 4 is fully lifted away from the valve seat 32).

The ball valve 4 is configured into a spherical form and is made of non-magnetic metal. The ball valve 4 is the first valve element that closes and opens the first valve hole 25 formed in the inside of the valve seat 32 when the ball valve 4 is seated against and lifted away from the valve seat 32. The ball valve 4 is displaceably held in a ball holder 35 that is fixed at a distal end side of the housing 3. A valve stopper 36, which is made of non-magnetic metal and limits the full lift position (full lift amount) of the ball valve 4, is provided in the ball holder 35.

The ball valve 4 is driven toward the one end side (the distal end side), which is opposite from a stopper breathing passage (described later), when the coil 9 is energized (the energization of the coil 9 is turned on).

Here, the hydraulic pressure control valve V adjusts the amount of lift of the ball valve 4, i.e., adjusts a cross-sectional area of the opening of the first valve hole 25 (a valve opening degree) based on the amount of energization of the coil 9 (the amount of electric current supplied to the coil 9), so that the hydraulic pressure of the hydraulic fluid (oil), which is the pressure fluid, is adjusted and is outputted to the hydraulic servo of the clutch (or the brake).

The bleed valve 5 is configured into an annular shape and is made of non-magnetic metal. The bleed valve 5 is formed integrally at an outer peripheral part of the valve shaft 6. Furthermore, the bleed valve 5 is the second valve element that closes and opens the second valve hole 26 formed in the inside of the valve seat 34 of the housing 3 when the bleed valve 5 is seated against and lifted away from the valve seat 34.

The bleed valve 5 is driven together with the ball valve 4 toward the distal end side, which is opposite from the stopper breathing passage, when the coil 9 is energized (the energization of the coil 9 is turned on).

The valve shaft 6 is made of non-magnetic metal. The valve shaft 6 extends linearly from the base end side to the distal end side in the axial direction and is placed along the central axis of the outer peripheral walls 17, 18.

The valve shaft 6 is driven together with the ball valve 4 and the bleed valve 5 toward the distal end side, which is opposite from the stopper breathing passage, when the coil 9 is energized (the energization of the coil 9 is turned on).

The valve shaft 6 conducts the drive force, which is exerted by the plunger 8 toward the one side in the axial direction (solenoid axial direction), to the ball valve 4 and the bleed valve 5 and conducts the urging force of the return spring 7, which is exerted to the valve shaft 6, to the plunger 8. Furthermore, the valve shaft 6 contacts the ball valve 4 and also contacts one end surface (a first end surface) of the plunger 8 in the axial direction, so that the valve shaft 6 serves as a connecting portion that connects between the ball valve 4 and the plunger 8. Furthermore, the valve shaft 6 integrally forms the bleed valve 5 at one axial end side of the valve shaft 6.

A large diameter shaft portion (a slide shaft portion) 39 is formed in the base end side of the valve shaft 6. The large diameter shaft portion 39 is axially slidably supported in the inside of the guide hole 16 of the housing 3.

A shaft slide part (a slide clearance), which enables smooth reciprocating movement of the valve shaft 6, is formed between the outer peripheral surface (the slide surface) of the large diameter shaft portion 39 of the valve shaft 6 and a hole wall surface (an inner peripheral surface) of the guide hole 16 of the housing 3. Furthermore, the guide hole 16 of the housing 3 forms a shaft slide hole, along which the outer peripheral surface of the valve shaft 6 directly slides.

A small diameter shaft portion 37 is formed at the distal end side of the valve shaft 6. The small diameter shaft portion 37 extends through the output ports 22 and the second valve hole 26 and projects into the input chamber 24 or the first valve hole 25 where the small diameter shaft portion 37 contacts the ball valve 4. Furthermore, the small diameter shaft portion 37 linearly extends from a center part of the bleed valve 5 toward the ball valve 4 side.

An intermediate diameter shaft portion 38 is formed to connect between the bleed valve 5, which forms a flange of the valve shaft 6, and the large diameter shaft portion 39. A diameter reducing portion and a spring inner diameter side holding portion are formed between the intermediate diameter shaft portion 38 and the large diameter shaft portion 39. The diameter reducing portion is configured into a truncated cone shape, and the spring inner diameter side holding portion is configured into an annular shape.

The bleed valve 5 includes a first diameter reducing portion and a second diameter reducing portion, which are integrally formed in the bleed valve 5. The first diameter reducing portion is configured to have a conical surface that has a progressively reducing outer diameter that is progressively reduced from an edge line of a maximum outer diameter part of the bleed valve 5 toward the distal end side (the small diameter shaft portion 37 side). The second diameter reducing portion is configured to have a conical surface that has a progressively reducing outer diameter that is progressively reduced from the edge line of the maximum outer diameter part of the bleed valve 5 toward the base end side (the intermediate diameter shaft portion 38 side). Furthermore, the first diameter reducing portion of the bleed valve 5 forms a seal surface that is seated against an edge line of the valve seat 34 of the housing 3.

The valve shaft 6 is integrally movably coupled (connected) with the ball valve 4. The bleed valve 5 is connected to the valve shaft 6, more specifically is integrally formed in the valve shaft 6. The return spring 7 is a compression coil spring that generates a resilient force (an urging force), which urges this valve shaft 6 toward the base end side (the solenoid side) in the axial hole that includes the guide hole 16, the first valve hole 25, the second valve hole 26, and the drain chamber 27.

The return spring 7 is placed in the drain chamber 27 (the drain chamber 27 also serving as a spring receiving chamber), which is located at the distal end side of the guide hole 16, such that the return spring 7 is held in a compressed state between a peripheral edge portion wall surface (a spring seat) of the partition wall 33 and a wall surface (a spring seat) of the large diameter shaft portion 39 of the valve shaft 6.

Next, details of the solenoid S of the present embodiment will be described with reference to FIGS. 1 to 3B.

The solenoid S is a solenoid actuator that drives the ball valve 4 and the bleed valve 5 of the hydraulic pressure control valve V toward the one end side (the distal end side) in the axial direction (the reciprocating direction) through the valve shaft 6 that is made of the non-magnetic material.

Specifically, the solenoid S includes the plunger 8, the coil 9, the stator core 11, the yoke 12, the ring core 13, the stopper plate 14 and the connector 15. In the solenoid S, when the coil 9 is energized, the magnetic circuit, which includes the plunger 8 and the stator (the stator core 11, the yoke 12, the ring core 13), is formed to magnetically attract the plunger 8 toward the stator core 11 side to execute the opening and closing drive operation of the ball valve 4 and the bleed valve 5.

Here, it should be noted that the solenoid valve of the present embodiment is an electromagnetic hydraulic pressure control valve (an electromagnetic valve) of a normally closed (N/C) type, so that the solenoid valve of the present embodiment communicates between the output ports 22 and the drain ports 23 and discommunicates between the input port 21 and the output ports 22 at the time (OFF time) of stopping the supply of the electric power to the coil 9 of the solenoid S, and the solenoid valve of the present embodiment reduces in a stepwise manner or a continuous manner a cross-sectional area of a communicating path between the output ports 22 and the drain ports 23 and increases in a stepwise manner or a continuous manner a cross-sectional area of a communication path between the input port 21 and the output ports 22 in response to an increase in the electric power supply to the coil 9.

The plunger 8 is reciprocatably and slidably placed at the radial location that is on the radially inner side of the stator core 11 and the plunger guide 41 of the yoke 12. The plunger 8 is made of a magnetic material (e.g., a ferromagnetic material, such as iron), which is magnetized when the coil 9 is energized.

The plunger 8 is the movable core (a moving core), which is magnetically attracted toward the one side in the solenoid axial direction by the magnetic force of the coil 9. The plunger 8 is urged together with the ball valve 4, the bleed valve 5, and the valve shaft 6 against an inner surface (a plunger limiting portion) of the stopper plate 14 by the urging force of the return spring 7 that is conducted to the valve shaft 6.

The plunger 8 is reciprocatably and slidably received in the inside (a plunger receiving chamber 42) of the plunger guide 41 of the yoke 12. The plunger receiving chamber 42 includes a plunger front side space and a plunger back side space (a first volume variable chamber 43 and a second volume variable chamber 44), which are formed at two opposite axial sides, respectively of the plunger 8.

A plunger guide hole (hereinafter referred to as a guide hole), which has a circular cross section, is formed in an inside (a radially inner side) of the plunger guide 41, and an outer peripheral surface (a slide surface) of the plunger 8 directly slides along the guide hole of the plunger guide 41. A plunger slide part (a slide clearance), which enables smooth reciprocating movement of the plunger 8, is formed between the outer peripheral surface (the slide surface) of the plunger 8 and a hole wall surface (an inner peripheral surface) of the guide hole of the plunger guide 41. Furthermore, the guide hole of the plunger guide 41 forms a plunger slide hole, along which the outer peripheral surface of the plunger 8 directly slides.

In order to ensure sufficient flow of the oil in the first and second volume variable chambers 43, 44 in response to the displacement of the plunger 8 in the plunger receiving chamber 42, the solenoid S of the solenoid valve includes a first oil breathing path, which communicates between the first volume variable chamber 43 and the outside of the solenoid S, and a second oil breathing path, which communicates between the second volume variable chamber 44 and the outside of the solenoid S.

Furthermore, an axial groove 45, which extends linearly in a direction parallel to the solenoid axial direction, is radially outwardly recessed in the inner peripheral surface (the hole wall surface of the guide hole 16) of the stator core 11 of the solenoid S. The axial groove 45 is formed by recessing (cutting, digging or hollowing) the inner peripheral surface of the stator core 11 by a predetermined depth in the radially outward direction.

The axial groove 45 is a core breathing passage and is formed in one location in the circumferential direction at the inner peripheral surface of the stator core 11. Here, it should be noted that instead of providing the single axial groove 45, a plurality of axial grooves 45 may be arranged one after another at predetermined intervals (e.g., equal intervals) in the circumferential direction at the inner peripheral surface of the stator core 11.

Furthermore, an opening end of the axial groove 45, which is located at the one side in the axial direction, opens to the drain port 23. Furthermore, another opening end of the axial groove 45, which is located at the other side in the axial direction, opens to the first volume variable chamber 43. Alternatively or additionally, a single axial groove or a plurality of axial grooves may be formed to linearly extend in the direction parallel to the solenoid axial direction in the outer peripheral surface of the large diameter shaft portion 39 of the valve shaft 6.

Furthermore, the drain port 23 communicates between the inside of the solenoid S (the first volume variable chamber 43 of the plunger receiving chamber 42) and the outside of the solenoid S (the oil storage chamber of the oil pan 1) through the axial groove 45. Thereby, it is possible to ensure the sufficient flow of the oil in the first volume variable chamber 43 in response to the displacement of the plunger 8 in the guide hole of the plunger guide 41.

The first oil breathing path is an oil supply path (a first breathing passage, a core breathing passage), which is formed between the outer peripheral part of the large diameter shaft portion 39 of the valve shaft 6 and a groove bottom surface of the axial groove 45 formed in the inner peripheral part of the stator core 11.

The second oil breathing path is an oil supply path, which is formed only by a second breathing passage (the stopper breathing passage described later) that is formed in the stopper plate 14.

Furthermore, the stopper breathing passage directly communicates between the inside of the solenoid S (the second volume variable chamber 44 of the plunger receiving chamber 42) and the outside of the solenoid S (the oil storage chamber of the oil pan 1). Thereby, it is possible to ensure the sufficient flow of the oil in the second volume variable chamber 44 in response to the displacement of the plunger 8 in the guide hole of the plunger guide 41.

A first end surface, which is configured into an annular shape, is formed in one end surface (a distal end surface) of the plunger 8, and the large diameter shaft portion 39 can contact the first end surface of the plunger 8. When the energization of the coil 9 is stopped (the energization of the coil 9 is turned off), the first end surface of the plunger 8 is opposed to a magnetically attracting portion 50 of the stator core 11 and is spaced from the magnetically attracting portion 50 by a predetermined distance (an axial distance, i.e., a gap). Furthermore, the first end surface of the plunger 8 has a convexly curved surface, which is in a form of a conical surface, and the convexly curved surface of the first end surface of the plunger 8 corresponds to a shape of the magnetically attracting portion 50 of the stator core 11 (i.e., a concavely curved surface, which is in a form of a conical surface, of the magnetically attracting portion 50 of the stator core 11). The convexly curved surface of the first end surface of the plunger 8 is contactable with the concavely curved surface of the magnetically attracting portion 50 of the stator core 11.

A second end surface, which is configured into an annular shape, is formed in the other end surface (a base end surface) of the plunger 8, which is opposite from the one end surface (the distal end surface) of the plunger 8. When the energization of the coil 9 is stopped (the energization of the coil 9 is turned off), the second end surface of the plunger 8 is urged against the inner surface of the stopper plate 14 by the urging force of the return spring 7.

A slide surface is formed in an outer peripheral surface of the plunger 8 to directly slidably contact an inner peripheral surface of the plunger guide 41 of the yoke 12.

The plunger receiving chamber 42 has the first volume variable chamber 43 and the second volume variable chamber 44. A volume of the first volume variable chamber 43 and a volume of the second volume variable chamber change at the time of operating the solenoid S.

The first volume variable chamber 43 is formed between the magnetically attracting portion (a base end surface) 50 of the stator core 11 and the first end surface of the plunger 8.

The second volume variable chamber 44 is formed between the second end surface of the plunger 8 and the inner surface of the stopper plate 14.

The coil 9 is a magnetic flux generating means (also referred to as a magnetic force generating means) that generates a magnetic force for magnetically attracting the plunger 8 to the stator core 11 when the electric power is supplied to the coil 9 (i.e., when the electric current is supplied to the coil 9, i.e., when the coil 9 is energized with the electric current). The coil 9 is a solenoid coil that is formed by winding an electrically conductive wire, which is covered with a dielectric film, around a cylindrical tubular portion of a coil bobbin (hereinafter referred to as a bobbin 47) made of dielectric synthetic resin (a primary molded resin portion, or a molded resin portion). Furthermore, the coil 9 is a device that generates the magnetic force to drive the ball valve 4, the bleed valve 5, the valve shaft 6 and the plunger 8 toward the one side in the axial direction of the housing 3 and the solenoid S.

In the solenoid S of the present embodiment, when the coil 9 is energized (the energization of the coil 9 is turned on), the ball valve 4, the bleed valve 5, the valve shaft 6 and the plunger 8 are driven from an initial position (a default position) to the one side (the distal end side) in the solenoid axial direction.

Furthermore, when the energization of the coil 9 is stopped (the energization of the coil 9 is turned off), the ball valve 4, the bleed valve 5, the valve shaft 6 and the plunger 8 are returned to the default position by the urging force of the return spring 7.

In the solenoid S of the present embodiment, when the coil 9 is energized, there is formed the magnetic circuit, in which the magnetic flux is concentrated and flows through the plunger 8, the stator core 11, the yoke 12 and the ring core 13.

The coil 9 includes a coil portion, which is wound around an outer peripheral surface of the cylindrical tubular portion of the bobbin 47 and is configured into a cylindrical tubular body, and a pair of coil lead lines, which are pulled outward from a winding start part and a winding terminal part, respectively, of the coil portion.

The coil lead lines are electrical conductors that form the coil 9, which is wound around a portion of the bobbin 47 between two flanges of the bobbin 47 and also around the outer peripheral surface of the cylindrical tubular portion of the bobbin 47, and the coil lead lines are electrically connected to the external circuit(s) through the terminals 48 of the connector 15.

Furthermore, an outer peripheral part of the coil 9 and an electrical connection between each coil lead line of the coil 9 and the corresponding one of the terminals 48 are protected by and are covered with a solenoid case 49, which is made of dielectric synthetic resin (a secondary molded resin portion, or a molded resin portion). The solenoid case 49 includes a cylindrical tubular portion and a connector case (a connector case of the connector 15). The cylindrical tubular portion of the solenoid case 49 surrounds the coil 9 and the bobbin 47 in the circumferential direction. The connector case of the solenoid case 49 receives distal end sides (external connection contacts) of the pair of terminals 48 in an exposed state where the distal end sides (external connection contacts) of the pair of terminals 48 are exposed in the connector case.

The stator of the present embodiment includes a radially inner side stationary core (the stator core 11 and the plunger guide 41 of the yoke 12), a radially outer side stationary core (a radially outer side cylindrical yoke 51 of the yoke 12), a distal end side stationary core (the ring core 13), and a base end side stationary core (an annular base end yoke 52). The radially inner side stationary core forms the magnetic path on the radially inner side of the coil 9. The radially outer side stationary core forms the magnetic path on the radially outer side of the coil 9. The distal end side stationary core covers one end side (a distal end side) of the coil 9 in the axial direction. The base end side stationary core covers the other end side (a base end side) of the coil 9 in the axial direction.

The stator core 11 is made of magnetic metal (a ferromagnetic material, such as iron), which is magnetized when the coil 9 is energized. The stator core 11 is formed integrally at the base end side of the housing 3. The magnetically attracting portion (the conical surface configured into the truncated cone shape) 50 is formed in the annular base end surface of the stator core 11 to magnetically attract the plunger 8 toward the distal end side in the solenoid axial direction. The magnetically attracting portion 50 is an opposing portion that is opposed to the first end surface of the plunger 8 and is spaced from the first end surface of the plunger 8 by a predetermined distance when the energization of the coil 9 is stopped (the energization of the coil 9 is turned off). The magnetically attracting portion 50 includes the concavely curved surface, which is in the form of the conical surface and contactable with the convexly curved surface of the plunger 8, which is configured to correspond with the concavely curved surface of the magnetically attracting portion 50.

The yoke 12 is made of magnetic metal (e.g., a ferromagnetic material, such as iron), which is magnetized when the coil 9 is energized. The yoke 12 includes the plunger guide 41, the radially outer side cylindrical yoke 51, and the annular base end yoke 52.

The plunger guide 41 of the yoke 12 is a radially inner side cylindrical yoke that is placed adjacent to the stator core 11. The magnetism (magnetic flux) is conducted between the plunger guide 41 and the plunger 8. A guide hole, which is configured to have a circular cross section and reciprocatably and slidably receives the plunger 8, is formed at a radially inner side of the plunger guide 41. Furthermore, the slide surface, which directly and slidably contacts the outer peripheral surface of the plunger 8, is formed in the inner peripheral surface of the plunger guide 41.

Furthermore, a magnetic resistance portion (a gap) is formed between the magnetically attracting portion 50 of the stator core 11 and the radially outer side cylindrical yoke 51 to reduce the flow of the magnetic flux between the magnetically attracting portion 50 of the stator core 11 and the radially outer side cylindrical yoke 51.

The radially outer side cylindrical yoke 51 of the yoke 12 forms an outer wall of the solenoid S located on the radially outer side and covers the outer peripheral part of the coil 9 with the cylindrical tubular body of the radially outer side cylindrical yoke 51. An annular step (surface) 53 and a claw portion 56 are formed in a distal end side of the radially outer side cylindrical yoke 51. The annular step 53 is formed to securely engage with an outer peripheral portion of the ring core 13. In a state where an inner peripheral portion of the ring core 13, a washer 54, which is configured into an annular plate form, and a collar 55, which is made of a non-magnetic material, are held between the step 19 of the housing 3 and the flange of the bobbin 47, the claw portion 56 is plastically deformed and is secured against an outer peripheral portion of the ring core 13.

The annular base end yoke 52 of the yoke 12 forms an outer wall of a base end side of the solenoid S and closes a base end side of the coil 9 in the axial direction with the annular plate body of the annular base end yoke 52. The annular base end yoke 52 is a connecting portion that connects between a base end side bent portion (i.e., a bent portion that is bent generally at the right angle) of the plunger guide 41, and a base end side bent portion (i.e., a bent portion that is bent generally at the right angle) of the radially outer side cylindrical yoke 51. The annular base end yoke 52 is also a closing portion that closes a base end side cylindrical opening that is formed between the base end side of the plunger guide 41 and the base end side of the radially outer side cylindrical yoke 51.

The ring core 13 is made of magnetic metal (e.g., a ferromagnetic material, such as iron), which is magnetized when the coil 9 is energized. The ring core 13 is press fitted to an outer peripheral surface of the outer peripheral wall 18 of the housing 3 such that the ring core 13 is pressed along the outer peripheral surface of the outer peripheral wall 18 until the ring core 13 contacts the step 19. Furthermore, a bracket 57 is formed integrally with the ring core 13. The bracket 57 is used to fix the solenoid valve to a stationary member, such as the valve body 2.

Here, it should be noted that the ring core 13 may be welded to the outer peripheral wall 18 of the housing 3 or may be formed integrally and seamlessly with the housing 3. Also, the stator core 11 and the ring core 13 may be formed as separate components, which are formed separately from the housing 3.

Furthermore, the ring core 13 and the bracket 57 may be formed as separate components, respectively, which are formed separately from each other. In such a case, the ring core 13 may be made of magnetic metal, and the bracket 57 may be made of non-magnetic metal.

The stopper plate (serving as a partition wall) 14 is formed into a predetermined form from non-magnetic metal or synthetic resin (a non-magnetic material). The stopper plate 14 includes a planar partition wall (a plate, a thin wall portion) 61, a projecting partition wall (a block, a thick wall portion) 62, and a stopper breathing passage (a second oil breathing path) 63. The planar partition wall 61 is configured into an annular shape and is fixed to the annular base end yoke 52 of the yoke 12 with a plurality of rivets 59. The projecting partition wall 62 is configured into a circular shape and projects from an outer surface of a center part of the planar partition wall 61 toward the outside of the solenoid S in the axial direction (i.e., toward the side opposite from the plunger 8 in the axial direction). The stopper breathing passage 63 extends through the planar partition wall 61 and the projecting partition wall 62 and communicates between the inside of the second volume variable chamber 44 and the outside of the solenoid S.

The planar partition wall 61 and the projecting partition wall 62 serve as a partitioning portion (partition wall), which partitions between the inside of the solenoid S (the second volume variable chamber 44 of the plunger receiving chamber 42) and the outside of the solenoid S (the oil storage chamber (an inside space) of the oil pan 1 that includes at least a lower part of the oil storage chamber, which is lower than a surface of the oil stored in the oil storage chamber in the direction of the gravitational force upon installation of the hydraulic pressure control apparatus of an automatic transmission on the vehicle). That is, the planar partition wall 61 and the projecting partition wall 62 serve as the partitioning portion, which partitions between the inside and the outside of the solenoid S.

An inner surface of the planar partition wall 61 is a limiting surface that limits the amount of displacement of the plunger 8 toward the other end side (the base end side) in the axial direction at the time of stopping the energization of the coil 9.

A flange (serving as a guide wall) 65 is formed integrally with the projecting partition wall 62. The flange 65 is configured into an annular shape and outwardly projects from an outer peripheral part of the projecting partition wall 62 in the radial direction.

The stopper breathing passage 63 includes a plurality of stopper breathing holes (simply referred to as breathing holes) 66 and an oil flow guide portion (a fluid flow guide portion) 67. The stopper breathing holes 66 are arranged one after another at predetermined intervals (e.g., equal intervals, such as 90 degree intervals) in the circumferential direction along a circle that is centered at the central axis of the solenoid S. The oil flow guide portion 67, which is configured into an annular shape, is formed between the outer surface of the planar partition wall 61 and the inner surface of the flange 65 and is communicated with the stopper breathing holes 66. The oil flow guide portion 67 extends outwardly from each stopper breathing hole 66 in the radial direction of the central axis of the solenoid S (i.e., a direction perpendicular to the axial direction) and opens to the outside of the solenoid S in the radial direction.

The stopper breathing holes 66 extend thorough the planar partition wall 61 in the axial direction and are arranged one after another in the circumferential direction. The projecting partition wall 62 is located on a radially inner side of the stopper breathing holes 66 in the radial direction of the central axis of the solenoid S. In other words, the projecting partition wall 62 is located on the radially inner side of the stopper breathing holes 66 where the central axis of the solenoid S, i.e., the central axis of the plunger 8 is placed. The flange 65 outwardly extends in the radial direction to a location, which is on a radially outer side of a radially innermost part (a radially innermost point that is closest to the central axis of the solenoid S in the radial direction) of each of the stopper breathing holes 66, to oppose all of the breathing holes 66 (or at least a portion of each of the breathing holes 66) in the axial direction. In the present embodiment, a radial location of an outer peripheral edge (a radially outer end) of the flange 65 is located on a radially outer side of a radially outermost part (a radially outermost point that is furthermost from the central axis of the solenoid S in the radial direction) of each of the stopper breathing holes 66. In other words, a radially outer end of the oil flow guide portion 67 (a radially outer end opening of a flow passage of the oil flow guide portion 67) is located on the radially outer side of the radially outermost part of each of the stopper breathing holes 66. However, the radial location of the outer peripheral edge of the flange 65 may be placed to generally coincide with a radial location of the radially outermost part of each of the stopper breathing holes 66 or may be placed on a radially inner side of the radially outermost part of each of the stopper breathing holes 66, if desired. Furthermore, it should be noted that in FIG. 2B, which is a plan view showing the solenoid shown in FIG. 2A, a radial extent of the projecting partition wall 62, which has the flange 65, is made shorter than a radial extent of the projecting partition wall 62 shown in FIG. 2A in order to clearly illustrate a location of a magnetism application region 69 discussed below.

The stopper breathing holes 66 are inside-to-outside communication holes, which extend through the planar partition wall 61 of the stopper plate 14 in a plate thickness direction (a direction that is parallel to the solenoid axial direction) and communicate between the inner surface and the outer surface of the planar partition wall 61.

Each of the stopper breathing holes 66 include a first opening (hereinafter referred to as a breathing hole inner side inlet and outlet opening), a second opening (hereinafter referred to as a breathing hole outer side inlet and outlet opening) and a breathing hole flow passage. The breathing hole inner side inlet and outlet opening opens in the inner surface of the planar partition wall 61 of the stopper plate 14. The breathing hole outer side inlet and outlet opening opens in the outer surface of the planar partition wall 61 of the stopper plate 14. The breathing hole flow passage communicates between the breathing hole inner side inlet and outlet opening and the breathing hole outer side inlet and outlet opening and extends linearly in the direction that is parallel to the solenoid axial direction.

In the solenoid S of the present embodiment, a region, which is adjacent to the oil flow guide portion 67 of the stopper breathing passage 63 (a breathing passage inlet and outlet opening), i.e., a region, which is placed immediately before the respective breathing hole outer side inlet and outlet openings of the stopper breathing holes 66, is formed in the magnetism application region 69. The magnetic flux, which is generated upon energization of the coil 9, is conducted through the plunger 8, the stator core 11, the yoke 12 and the ring core 13 in the magnetic circuit, and the magnetism application region 69 is defined as an annular region, through which a leakage magnetic flux leaking from the magnetic circuit to the outside of the solenoid S passes. In other words, the magnetism application region 69 is a region, through which the magnetism leaks upon the energization of the coil 9 (turning on of the energization of the coil 9). In the present embodiment, the magnetism application region 69 is located on a radially outer side of the breathing holes 66 and a radially inner part of the oil flow guide portion 67 on the planar partition wall 61.

Figure 2A:
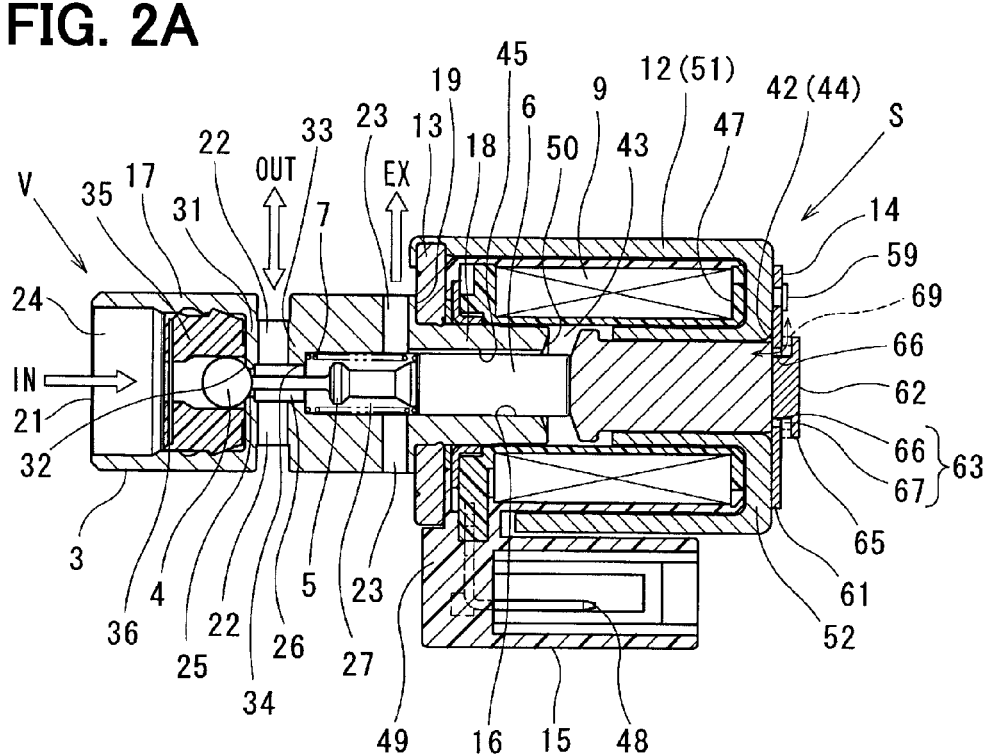
FIG. 2A is a cross-sectional view showing the solenoid valve of the first embodiment.
Figure 2B:
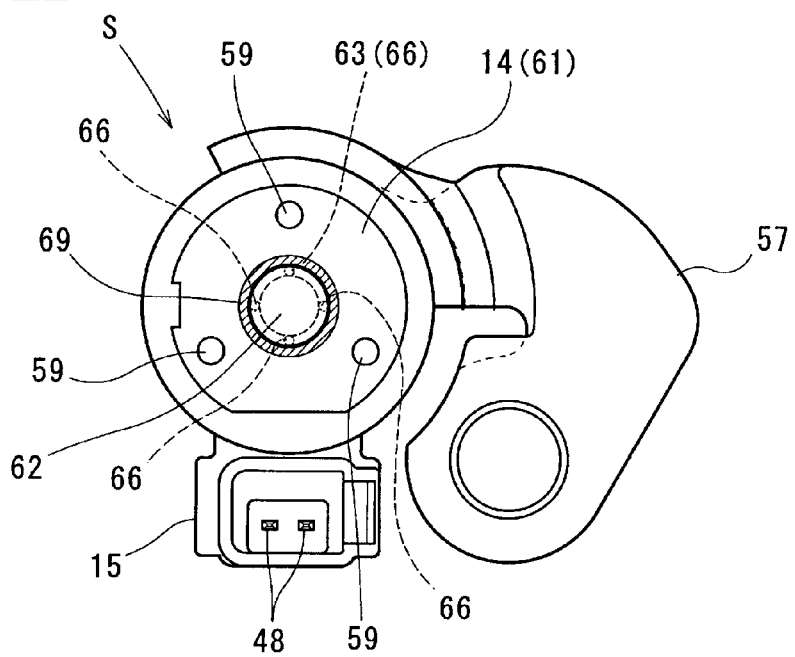
FIG. 2B is a plan view showing a solenoid of the first embodiment shown in FIG. 2A.

Furthermore, as shown in FIG. 2A, a radial location of the magnetism application region 69 generally coincides with a radial location of the inner peripheral surface of the plunger guide 41 of the yoke 12. In other words, when the magnetism application region 69, which is the annular region (a region in a form of a ring), is viewed in the axial direction from the right side in FIG. 2A, the magnetism application region 69 overlaps with a circle that extends in the circumferential direction along the inner peripheral surface of the plunger guide 41 of the yoke 12. Furthermore, a radial width of the ring (a band width of the ring) of the magnetism application region 69 may be in a range of, for example, several to ten millimeters (e.g., about two millimeters in one exemplary case). However, the radial width of the ring of the magnetism application region 69 may be larger than two millimeters or smaller than two millimeters depending on an intended application. Also, a magnetic flux density of the leakage magnetic flux at the magnetism application region 69 is sufficiently high to magnetically attract a sufficient amount of magnetic foreign objects contained in the oil upon energization of the coil 9 (details of the magnetic attraction of the foreign objects will be described later). Therefore, when a large amount of magnetic foreign objects are magnetically attracted to the magnetism application region 69 on the planar partition wall 61, a ring of the magnetic foreign objects magnetically attracted to the magnetism application region 69 on the planar partition wall 61 is visually recognizable.

The oil flow guide portion 67 of the stopper breathing passage 63 opens along the entire circumferential extent of the flange 65. The oil flow guide portion 67 (more specifically, the flange 65, which defines the oil flow guide portion 67) is formed to direct a flow direction of the oil (see a double-sided arrow in FIG. 2A), which inflows from the outside of the solenoid S into the stopper breathing holes 66, toward the magnetism application region 69. More specifically, when the oil flows from the outside of the solenoid S into the stopper breathing passage 63, the flow guide portion 67 directs a flow of the oil in the radial direction to pass along at least a portion of the magnetism application region 69 and then directs the flow of the oil in the axial direction at a location that is on a radially inner side of the magnetism application region 69. Furthermore, the oil flow guide portion 67 (more specifically, the flange 65, which defines the oil flow guide portion 67) is formed to direct a flow direction of the oil (see the double-sided arrow in FIG. 2A), which outflows from the breathing hole outer side inlet and outlet openings of the stopper breathing holes 66 to the outside of the solenoid S, toward the magnetism application region 69.

Next, the operation of the solenoid S, which drives the hydraulic pressure control valve V used in the solenoid valve of the present embodiment, will be briefly described with reference to FIGS. 1 to 3B.

In a case where the energization of the coil 9 is stopped (the energization of the coil 9 is turned off), the ball valve 4, the bleed valve 5, the valve shaft 6 and the plunger 8 are stopped at the default position thereof by the urging force of the return spring 7. At this time, the second end surface of the plunger 8 of the solenoid S contacts the inner surface of the stopper plate 14, so that further movement of the plunger 8 toward the other end side (the base end side) in the axial direction is limited.

In this way, in the plunger receiving chamber 42, the volume of the first volume variable chamber 43 formed between the magnetically attracting portion 50 of the stator core 11 and the first end surface of the plunger 8 is maximized, and the volume of the second volume variable chamber 44 formed between the second end surface of the plunger 8 and the inner surface of the stopper plate 14 is minimized.

At this time, the oil does not inflow and outflow between the outside of the solenoid S (the oil storage chamber of the oil pan 1) and the first volume variable chamber 43 through the first breathing passage, which is formed between the outer peripheral part of the large diameter shaft portion 39 of the valve shaft 6 and the groove bottom surface of the axial groove 45 of the stator core 11, and also through the drain port 23. Also, at this time, the oil does not inflow and outflow between the outside of the solenoid S (the oil storage chamber of the oil pan 1) and the second volume variable chamber 44 through the stopper breathing passage 63 formed in the stopper plate 14.

When the energization of the coil 9 of the solenoid S is started (turning on of the energization of the coil 9 is started), the plunger 8 is magnetically attracted to the magnetically attracting portion 50 of the stator core 11 with a magnetic attractive force, a degree of which corresponds to the amount of the exciting electric current that flows through the coil 9. In response to this, the valve shaft 6, which contacts the ball valve 4 at the distal end of the valve shaft 6 and has the bleed valve 5 formed in the intermediate portion of the valve shaft 6, is urged toward the one side in the axial direction of the housing 3 of the hydraulic pressure control valve V, so that in response to the increase in the amount of the electric current supplied to the coil 9, the bleed valve 5 reduces in the stepwise manner or continuous manner the cross-sectional area of the communicating path between the output port 22 and the drain port 23, and the ball valve 4 increases in the stepwise manner or continuous manner the cross-sectional area of the communicating path between the input port 21 and the output port 22.

In this way, in the plunger receiving chamber 42, the volume of the first volume variable chamber 43, which is formed between the magnetically attracting portion 50 of the stator core 11 and the first end surface of the plunger 8, begins to decrease, and the volume of the second volume variable chamber 44, which is formed between the second end surface of the plunger 8 and the inner surface of the stopper plate 14, begins to increase.

At this time, since the volume of the first volume variable chamber 43 is decreasing, the oil is discharged from the first volume variable chamber 43 to the outside of the solenoid S (the oil storage chamber of the oil pan 1) through the first breathing passage, which is formed between the outer peripheral part of the large diameter shaft portion 39 of the valve shaft 6 and the groove bottom surface of the axial groove 45, and also through the drain port 23. Furthermore, since the volume of the second volume variable chamber 44 is increasing, the oil is drawn (is conducted) from the outside of the solenoid S (the oil storage chamber of the oil pan 1) to the second volume variable chamber 44 through the stopper breathing passage 63 of the stopper plate 14.

Here, in the solenoid S of the present embodiment, the region, which is adjacent to the oil flow guide portion 67 of the stopper breathing passage 63, i.e., the region, which is placed immediately before the respective breathing hole outer side inlet and outlet openings of the stopper breathing holes 66, is formed in the magnetism application region 69, which is the annular region and through which the leakage magnetic flux leaking from the magnetic circuit to the outside of the solenoid S passes. Therefore, the foreign objects (e.g., magnetic foreign objects made of, for example, iron or an iron containing material), which are mixed into the oil drawn from the outside of the solenoid S (the oil storage chamber of the oil pan 1) to the second volume variable chamber 44, are magnetically attracted (captured or collected) by the magnetic flux leaking from the magnetic circuit to the outside of the solenoid S (the oil storage chamber of the oil pan 1).

Figure 3A:
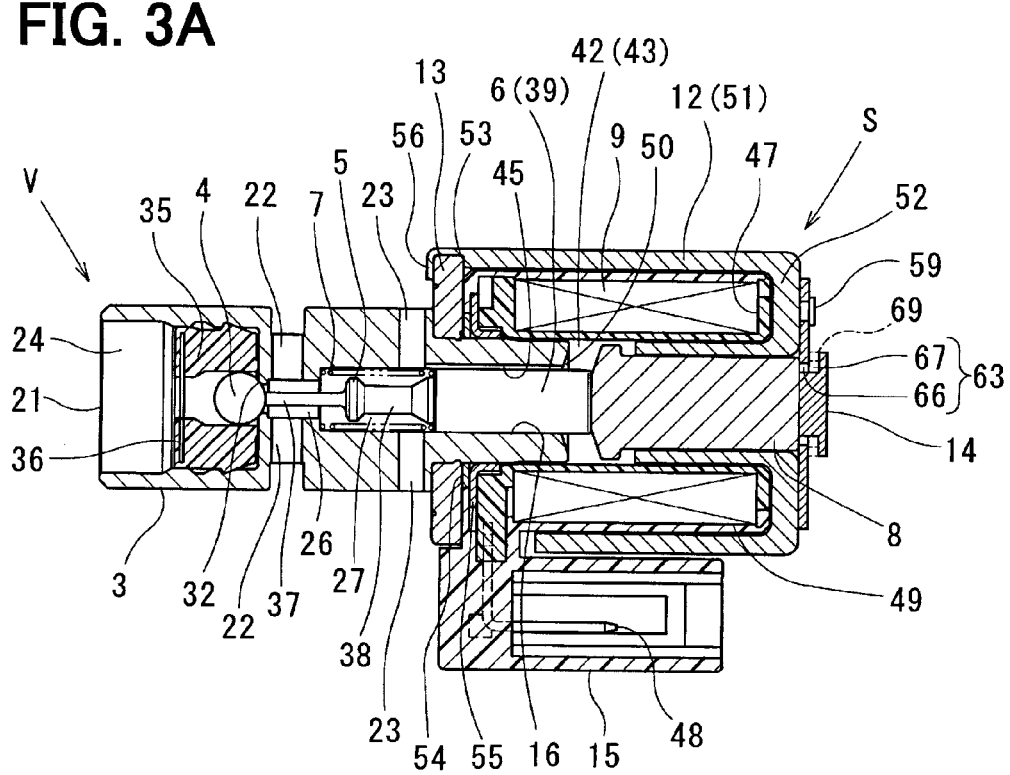
FIG. 3A is a cross-sectional view showing a state of the solenoid valve at the time of turning off of energization of a coil according to the first embodiment.
Figure 3B:
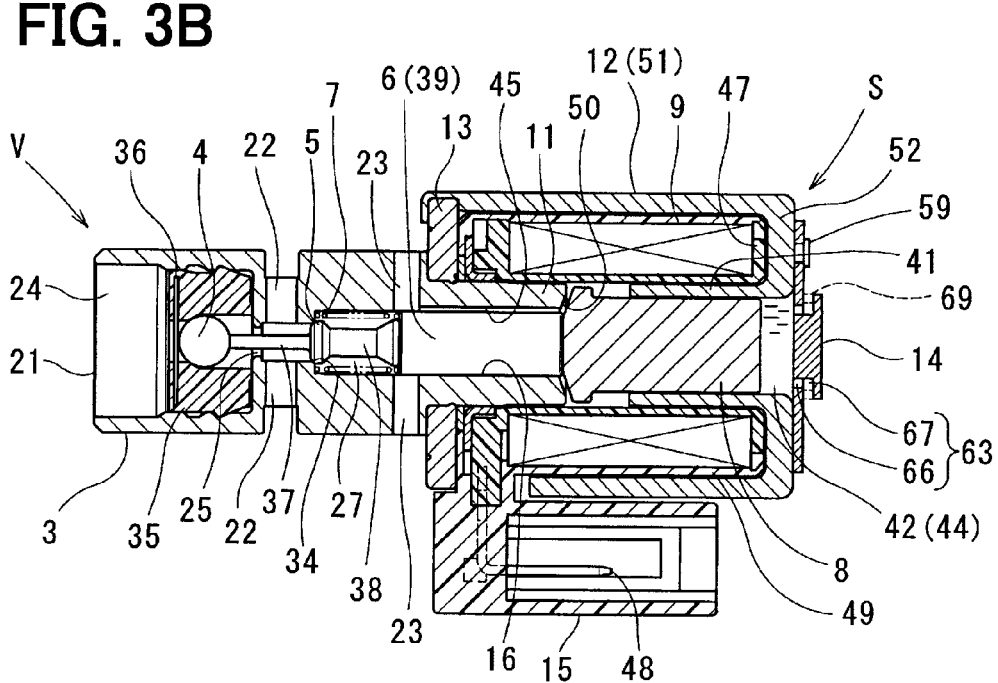
FIG. 3B is a cross-sectional view showing another state of the solenoid valve at the time of turning on of the energization of the coil according to the first embodiment.
Figure 4A:
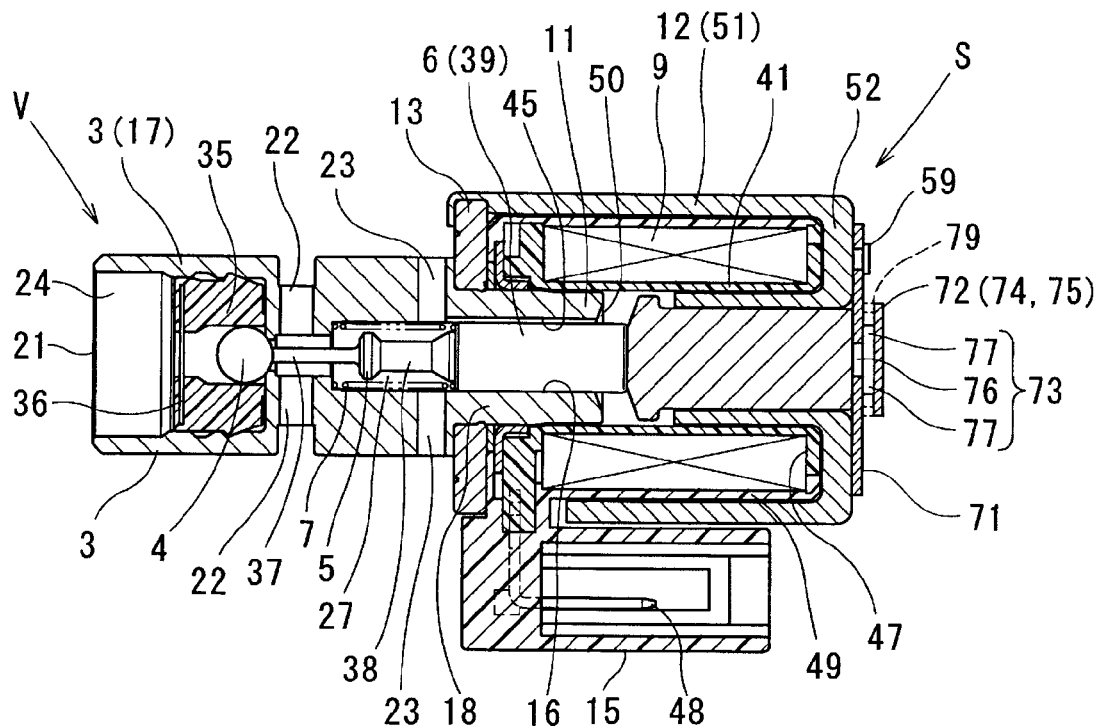
FIG. 4A is a cross-sectional view showing a solenoid valve according to a second embodiment of the present disclosure.
Figure 4B:
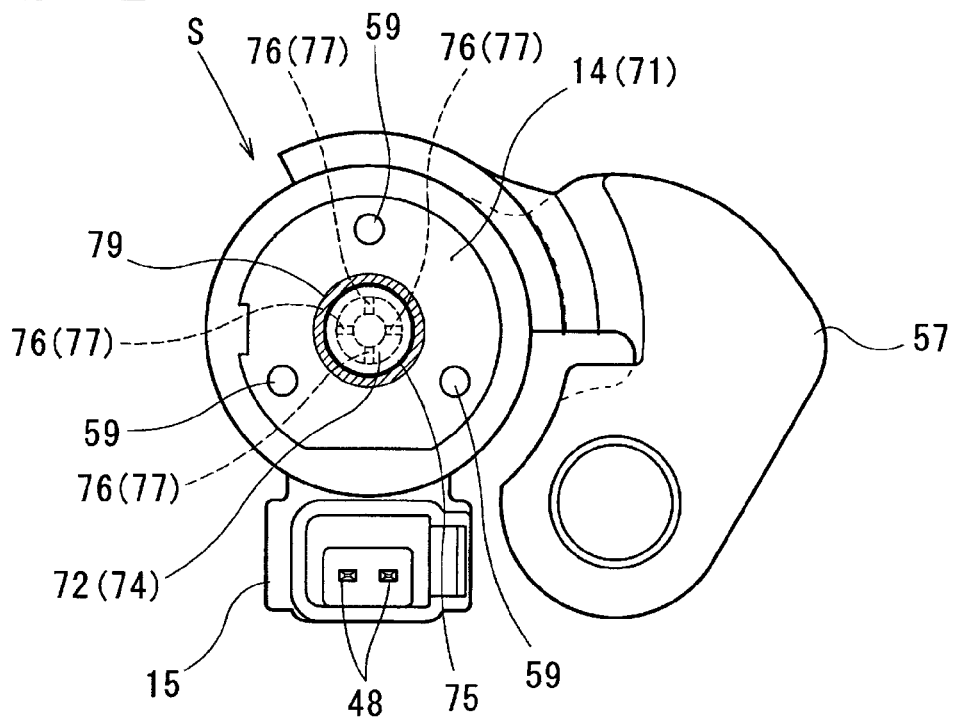
FIG. 4B is a plan view showing a solenoid of the second embodiment shown in FIG. 4A.
Figure 5A:
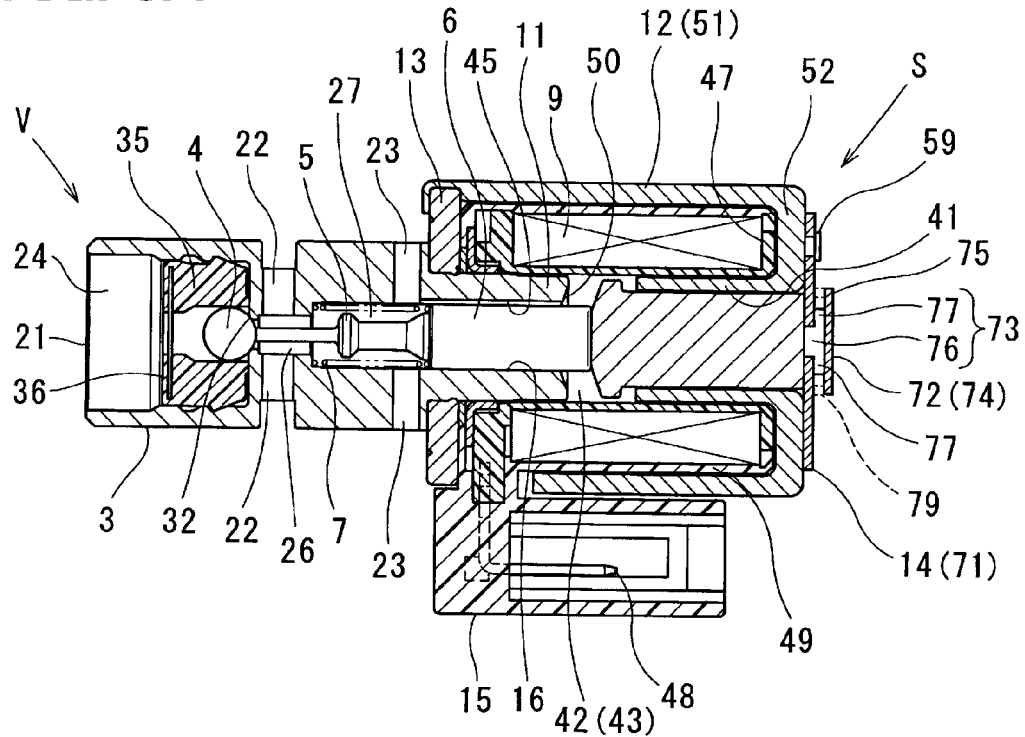
FIG. 5A is a cross-sectional view showing a state of the solenoid valve at the time of turning off of energization of a coil according to the second embodiment.
Figure 5B:
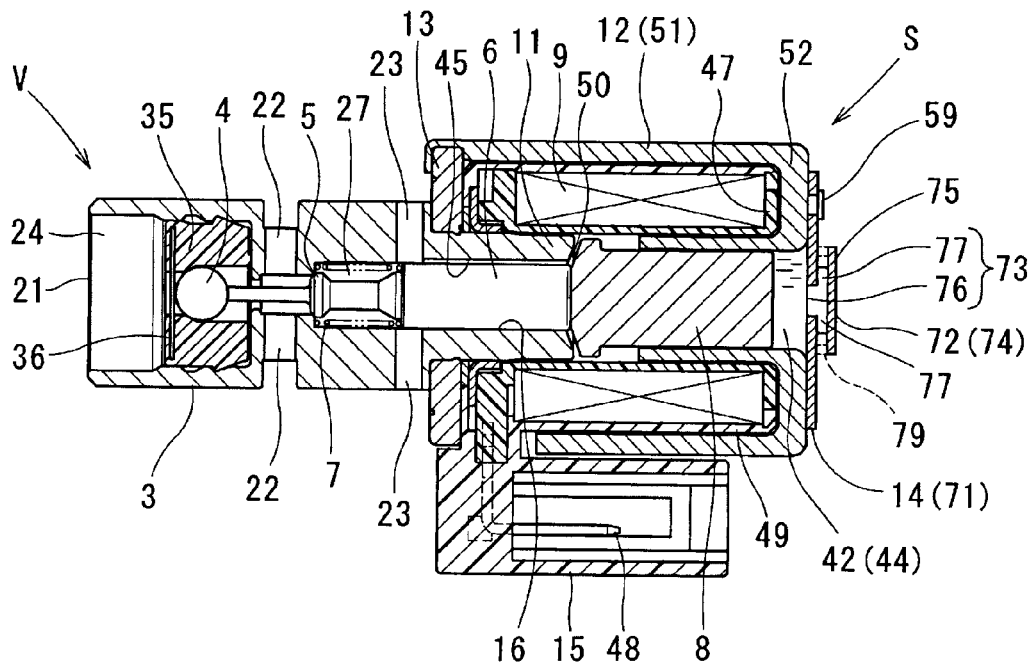
FIG. 5B is a cross-sectional view showing another state of the solenoid valve at the time of turning on of the energization of the coil according to the second embodiment.

FIG. 3B shows a state where the amount of the exciting electric current, which flows through the coil 9, is set to a maximum value, so that the ball valve 4 and the valve shaft 6 are fully lifted relative to the valve seat 32 (in a full lift state), and the bleed valve 5 is seated against the valve seat 34 (in a zero lift state).

When the amount of the electric current, which is supplied to the coil 9, is reduced, the plunger 8 is returned to the base end side in the axial direction. Therefore, the volume of the first volume variable chamber 43, which is formed between the magnetically attracting portion 50 of the stator core 11 and the first end surface of the plunger 8, begins to increase, and the volume of the second volume variable chamber 44, which is formed between the second end surface of the plunger 8 and the inner surface of the stopper plate 14, begins to decrease.

Furthermore, at this time, since the volume of the first volume variable chamber 43 is increasing, the oil is drawn (is conducted) from the outside of the solenoid S (the oil storage chamber of the oil pan 1) to the first volume variable chamber 43 through the first breathing passage, which is formed between the outer peripheral part of the large diameter shaft portion 39 of the valve shaft 6 and the groove bottom surface of the axial groove 45, and also through the drain port 23. Furthermore, since the volume of the second volume variable chamber 44 is decreasing, the oil is discharged from the second volume variable chamber 44 to the outside of the solenoid S (the oil storage chamber of the oil pan 1) through the stopper breathing passage 63 of the stopper plate 14.

Here, FIG. 3A shows a state where the energization of the coil 9 is stopped (the energization of the coil 9 is turned off), so that the ball valve 4 is seated against the valve seat 32 (in a zero lift state), and the bleed valve 5 is fully lifted from the valve seat 34 (in a fully lifted state).

In a case where the leakage magnetic flux, which leaks from the magnetic circuit to the outside of the solenoid S (the oil storage chamber of the oil pan 1), is lost after the stopping (turning off) of the energization of the coil 9, the magnetic foreign objects (made of the iron or the iron containing material), which have been previously magnetically attracted by the magnetic flux and are captured at the outer surface of the corresponding portion of the planar partition wall 61 in the magnetism application region 69, are released from the magnetism application region 69 and are sunk toward the lower side in the direction of the gravitational force in the oil pan 1.

Now, advantage of the first embodiment will be described.

As discussed above, the stopper plate 14 of the solenoid S, which is used in the solenoid valve of the present embodiment, includes the planar partition wall 61, the projecting partition wall 62, and the stopper breathing passage 63. The planar partition wall 61 and the projecting partition wall 62 partition between the inside of the second volume variable chamber 44 of the plunger receiving chamber 42 and the outside of the solenoid S (the oil storage chamber of the oil pan 1). The stopper breathing passage 63 extends through the planar partition wall 61 and the projecting partition wall 62 and communicates between the inside of the second volume variable chamber 44 and the outside of the solenoid S. Furthermore, the stopper breathing passage 63 includes the stopper breathing holes 66 and the oil flow guide portion 67. The stopper breathing holes 66 extend through the planar partition wall 61. The oil flow guide portion 67 is formed between the outer surface of the planar partition wall 61 and the inner surface of the flange 65 and directs the flow direction of the oil, which inflows or outflows through the breathing hole outer side inlet and outlet openings of the stopper breathing holes 66, toward the magnetism application region 69.

The region, which is adjacent to the oil flow guide portion 67 of the stopper breathing passage 63, i.e., the region, which is placed immediately before the respective breathing hole outer side inlet and outlet openings of the stopper breathing holes 66, is formed in the annular magnetism application region 69, through which the magnetic flux generated upon turning on of the energization of the coil 9 passes.

Therefore, the magnetic foreign objects, which are made of, for example, the iron or iron containing material, are magnetically attracted (captured or collected) by the magnetic flux leaking from the magnetic circuit to the outside of the solenoid S at the time of turning on of the energization of the coil 9 of the solenoid S. At this time, the foreign objects are magnetically attracted (captured or collected) to the region adjacent to the oil flow guide portion 67 at the outer surface of the planar partition wall 61 of the stopper plate 14, so that intrusion of the foreign objects from the outside of the solenoid S into the second volume variable chamber 44 of the plunger receiving chamber 42 through the stopper breathing passage 63 is limited.

Thus, intrusion of the foreign objects into the slide clearance between the outer peripheral surface (the slide surface) of the plunger 8 and the hole wall surface (the inner peripheral surface) of the guide hole of the plunger guide 41 of the yoke 12 is limited, and thereby occurrence of an inoperable state (valve locked state) or a malfunctioning state of the valve shaft 6 and the plunger 8 caused by capturing (sticking) of the foreign object(s) in the slide clearance can be effectively limited.

In this way, it is possible to achieve both of the improved fuel consumption, which is implemented through the speed change control operation of the automatic transmission, and the improved reliability, which is implemented by limiting the malfunctioning caused by the intrusion of the foreign objects.

Furthermore, the intrusion of the foreign objects into the second volume variable chamber 44 of the plunger receiving chamber 42, which is formed between the magnetically attracting portion 50 of the stator core 11 and the stopper plate 14 on the radially inner side of the plunger guide 41 of the yoke 12, is limited, so that the capturing (sticking) of the foreign object(s) at the slide part (the slide clearance) between the outer peripheral surface of the plunger 8 and the inner peripheral surface of the plunger guide 41 of the yoke 12 is limited. In this way, at the time of operating the solenoid S, the smooth reciprocating movement of the plunger 8 in the axial direction relative to the guide hole of the plunger guide 41 can be achieved.

As a result, since the intrusion of the foreign objects into the plunger receiving chamber 42 can be limited, the occurrence of the inoperable state (valve locked state) or the malfunctioning state of the solenoid S and the hydraulic pressure control valve V can be limited. Thereby, the appropriate hydraulic pressure control operation can be performed.

Second Embodiment

FIGS. 4A to 5B indicate a solenoid valve according to a second embodiment of the present disclosure. In the following discussion, the components, which are similar to those of the first embodiment, will be indicated by the same reference numerals and will not be described further for the sake of simplicity.

Similar to the first embodiment, the solenoid valve of the present embodiment includes the solenoid S. In the solenoid S, when the coil 9 is energized (the energization of the coil 9 is turned on), the magnetic circuit, in which the magnetic flux flows through the plunger 8, the yoke 12 and the ring core 13, is formed to drive the ball valve 4, the bleed valve 5 and the valve shaft 6 toward the one end side (the distal end side) in the axial direction, so that the cross-sectional area of the communicating path between the output port 22 and the drain port 23 and the cross-sectional area of the communication path between the input port 21 and the output port 22 are changed accordingly.

Specifically, the solenoid S includes the plunger 8, the coil 9, the stator core 11, the yoke 12, the ring core 13, the stopper plate 14 and the connector 15.

The stopper plate 14 includes a planar partition wall (a plate, a thin wall portion) 71, a projecting partition wall (a block, a thick wall portion) 72, and a stopper breathing passage (an oil breathing path) 73. The planar partition wall 71 is configured into an annular shape and is fixed to the annular base end yoke 52 of the yoke 12 with the rivets 59. The projecting partition wall 72 is configured into a circular shape and projects from an outer surface of a center part of the planar partition wall 71 toward the outside of the solenoid S. The stopper breathing passage 73 extends through the planar partition wall 71 and the projecting partition wall 72 and communicates between the inside of the second volume variable chamber 44 and the outside of the solenoid S.

The planar partition wall 71 and the projecting partition wall 72 serve as a partitioning portion (partition wall), which partitions between the inside of the second volume variable chamber 44 of the plunger receiving chamber 42 and the outside of the solenoid S.

An inner surface of the planar partition wall 71 is a limiting surface that limits the amount of displacement of the plunger 8 toward the other end side (the base end side) in the axial direction at the time of stopping (turning off) the energization of the coil 9.

The projecting partition wall 72 has a ceiling plate portion 74, which is configured into a circular plate form. The ceiling plate portion 74 is opposed to and is spaced from the outer surface of the planar partition wall 71 by a predetermined distance (an axial distance). A flange (serving as a guide wall) 75 is formed integrally with the ceiling plate portion 74. The flange 75 of the present embodiment is configured into an annular shape and outwardly projects from an outer peripheral part of the ceiling plate portion 74 in the radial direction.

The stopper breathing passage 73 includes a plurality of stopper breathing holes 76 and a plurality of oil flow guide portions (a plurality of fluid flow guide portions) 77. Each of the stopper breathing holes 76 is formed to extend in a direction parallel to the central axis of the solenoid S. The oil flow guide portions 77 are formed between the outer surface of the planar partition wall 71 and the inner surface of the flange 75 and are communicated with the stopper breathing holes 76, respectively. More specifically, each of the oil flow guide portions 77 is placed next to a corresponding one of the stopper breathing holes 76 in the axial direction. Furthermore, each circumferentially adjacent two of the oil flow guide portions 77 (and thereby each circumferentially adjacent two of the stopper breathing holes 76) are circumferentially separated from each other by a corresponding partition wall.

The stopper breathing holes 76 extend thorough the planar partition wall 71 in the axial direction and are arranged one after another in the circumferential direction. The projecting partition wall 72 is located on a radially inner side of the stopper breathing holes 76 in the radial direction of the central axis of the solenoid S. The flange 75 outwardly extends in the radial direction to a location, which is on a radially outer side of a radially innermost part (a radially innermost point) of each of the stopper breathing holes 76, to oppose all of the breathing holes 76 (or at least a portion of each of the breathing holes 76) in the axial direction. In the present embodiment, a radial location of an outer peripheral edge (a radially outer end) of the flange 75 generally coincides with a radial location of a radially outermost part (a radially outermost point) of each of the stopper breathing holes 76. However, the radial location of the outer peripheral edge of the flange 75 may be placed on a radially inner side of the radially outermost part of each of the stopper breathing holes 76 or on a radially outer side of the radially outermost part of each of the stopper breathing holes 76 in some cases.

The stopper breathing holes 76 are inside-to-outside communication holes, which extend through the planar partition wall 71 of the stopper plate 14 in a plate thickness direction (a direction that is parallel to the solenoid axial direction) and communicate between the inner surface and the outer surface of the planar partition wall 71.

Each of the stopper breathing holes 76 includes a first opening (hereinafter referred to as a breathing hole inner side inlet and outlet opening), a second opening (hereinafter referred to as a breathing hole outer side inlet and outlet opening) and a breathing hole flow passage. The breathing hole inner side inlet and outlet opening of each stopper breathing hole 76 opens in the inner surface of the planar partition wall 71 of the stopper plate 14. The breathing hole outer side inlet and outlet opening of each stopper breathing hole 76 opens in the outer surface of the planar partition wall 71 of the stopper plate 14. The breathing hole flow passage of each stopper breathing hole 76 communicates between the breathing hole inner side inlet and outlet opening and the breathing hole outer side inlet and outlet opening of the stopper breathing hole 76 and extends linearly in the direction that is parallel to the solenoid axial direction.

In the solenoid S of the present embodiment, a region, which is adjacent to the oil flow guide portions 77 of the stopper breathing passage 73 (a breathing passage inlet and outlet opening), i.e., a region, which is placed immediately before the breathing hole outer side inlet and outlet opening of the stopper breathing passage 73, is formed in a magnetism application region 79. The magnetic flux, which is generated upon turning on of the energization of the coil 9, is conducted through the plunger 8, the stator core 11, the yoke 12 and the ring core 13 in the magnetic circuit, and the magnetism application region 79 is defined as an annular region, through which a leakage magnetic flux leaked from the magnetic circuit to the outside of the solenoid S passes. In other words, the magnetism application region 79 is a region, through which the magnetism leaks upon the energization of the coil 9. In the present embodiment, the magnetism application region 79 is located on a radially outer side of the breathing holes 76 and the oil flow guide portions 77 on the planar partition wall 71.

Here, the oil flow guide portions 77 of the stopper breathing passage 73 are arranged one after another at predetermined intervals (e.g., equal intervals, such as 90 degree intervals) in the circumferential direction of the flange 75. The oil flow guide portions 77 (more specifically, the flange 75, which defines the oil flow guide portions 77) are formed to direct a flow direction of the oil, which inflows from the outside of the solenoid S into the stopper breathing holes 66, toward the magnetism application region 79. Furthermore, the oil flow guide portions 77 (more specifically, the flange 75, which defines the oil flow guide portions 77) are formed to direct a flow direction of the oil, which outflows from the breathing hole outer side inlet and outlet openings of the stopper breathing holes 76 to the outside of the solenoid S, toward the magnetism application region 79.

As discussed above, the solenoid S used in the solenoid valve of the present embodiment can achieve advantages, which are similar to the advantages discussed in the first embodiment.

Now, modifications of the above embodiments will be described.

In the above embodiments, the solenoid of the present disclosure is applied as the solenoid (the actuator) S, which drives the ball valve 4 and the bleed valve 5 (the first and second valve elements) of the hydraulic pressure control valve V installed in the hydraulic pressure control apparatus that controls the hydraulic pressure of the automatic transmission of the vehicle. Alternatively, the solenoid of the present disclosure may be applied as a solenoid that drives a movable member (the movable member may be formed separately from the plunger or may be formed integrally with the plunger) of an electromagnetic switch, an electromagnetic clutch, or an electromagnetic brake.

In the above embodiments, the solenoid of the present disclosure is applied as the solenoid (the actuator) S, which drives the ball valve 4 and the bleed valve 5 (the first and second valve elements) of the hydraulic pressure control valve V installed in the hydraulic pressure control apparatus that controls the hydraulic pressure of the automatic transmission of the vehicle. Alternatively, the solenoid of the present disclosure may be applied as a solenoid (an actuator) that drives a valve element (e.g., a spool valve, a ball valve, a bleed valve) of a control valve used in a fluid pressure control operation, a flow amount control operation or a flow passage change operation.

That is, the solenoid of the present disclosure may be applied as a solenoid (an actuator) that drives a valve element of an electromagnetic control valve (a solenoid control valve), such as an electromagnetic (fluid) pressure control valve, an electromagnetic (fluid) flow amount control valve, or an electromagnetic flow passage change control valve.

Furthermore, the solenoid of the present disclosure may be applied as a solenoid (an actuator) that drives a valve element of an electromagnetic oil flow passage change valve (an oil control valve (OCV)) used in a variable valve timing (VVT) system that changes opening timing and closing timing of an intake valve or an exhaust valve of an internal combustion engine.

Furthermore, the present disclosure may be applied to a solenoid (an actuator) that drives another type of valve (valve element), such as a spool valve, a poppet valve, in place of the ball valve 4 and the bleed valve 5.

Furthermore, the structure of the present disclosure may be applied to a movable core, which has a shaft and a plunger that are formed integrally. Furthermore, the shaft may be made of a magnetic material.

In the above embodiments, the electromagnetic hydraulic pressure control valve (the electromagnetic control valve, the electromagnetic valve) of the normally closed (N/C) type is used as the solenoid valve. Alternatively, the solenoid valve of the present disclosure may be an electromagnetic hydraulic pressure control valve (an electromagnetic control valve, an electromagnetic valve) of a normally open (N/O) type. The electromagnetic hydraulic pressure control valve of the normally open (N/O) type communicates between the input port 21 and the output port 22 and discommunicates between the output port 22 and the drain port 23 at the time of energizing (turning ON) the coil 9 of the solenoid S. The electromagnetic hydraulic pressure control valve of the normally open (N/O) type reduces in a stepwise manner or a continuous manner a cross-sectional area of a communicating path between the input port 21 and the output port 22 and increases in a stepwise manner or a continuous manner a cross-sectional area of a communication path between the output port 22 and the drain port 23 in response to a decrease in the electric power supply to the coil 9.

In the above embodiments, the region, which is adjacent to the oil flow guide portion (the breathing passage inlet and outlet opening) of the stopper breathing passage (the second oil breathing path) 63, 73 of the solenoid S, is formed in the magnetism application region 69, 79, and the leakage magnetic flux, which leaks from the magnetic circuit to the outside of the solenoid S (including the outer surface of the stopper plate 14), flows through the magnetism application region 69, 79 upon energization of the coil 9. Alternatively, a portion or all of the stopper breathing passage (the second oil breathing path), i.e., at least a portion of the stopper breathing passage (the second oil breathing path) of the solenoid S may be formed in the magnetism application region, and the leakage magnetic flux, which leaks from the magnetic circuit to the outside of the solenoid S (including the outer surface of the stopper plate 14), may flow through the magnetism application region upon energization of the coil 9.

Furthermore, the region, which is adjacent to the oil (fluid) flow guide portion (the breathing passage inlet and outlet opening) of the first oil (fluid) breathing path of the solenoid S, or at least a portion of the first oil (fluid) breathing path of the solenoid S may be formed in the magmagnetism application region, and the leakage magnetic flux, which leaks from the magnetic circuit, may flow through the magnetism application region upon energization of the coil 9.

A plurality of slits (e.g., a crisscross shaped groove) may be formed in the first end surface (a magnetic pole surface) or the convexly curved surface of the plunger 8 to reduce a contact surface area between the magnetically attracting portion 50 of the stator core 11 and the plunger 8 at the time of fully lifting the plunger 8 and thereby to limit a delay (the operational malfunction of the plunger 8) in the departure of the plunger 8 from the magnetically attracting portion 50 caused by the residual magnetism that is left after the stopping of the energization of the coil 9.

Furthermore, a plurality of slits (e.g., a crisscross shaped groove) may be formed in the end surface (a magnetic pole surface) or the concavely curved surface of the magnetically attracting portion 50 to reduce the contact surface area between the magnetically attracting portion 50 of the stator core 11 and the plunger 8 at the time of fully lifting the plunger 8 and thereby to limit the delay (the operational malfunction of the plunger 8) in the departure of the plunger 8 from the magnetically attracting portion 50 caused by the residual magnetism that is left after the stopping of the energization of the coil 9.

Furthermore, each of the first end surface (the magnetic pole surface) of the plunger 8 and the end surface (the magnetic surface) of the stator core 11 may be formed as a planar surface.

What is claimed is:
1. A solenoid comprising:
a plunger that is reciprocatable in an axial direction;
a stator that includes:
  a core, which is opposed to the plunger in the axial direction and is spaced from the plunger by a predetermined distance;
  a plunger guide that is configured into a tubular form and is placed adjacent to the core, wherein the plunger guide reciprocatably and slidably supports the plunger; and
  a plunger receiving chamber that is placed on a radially inner side of the plunger guide and reciprocatably and slidably receives the plunger;
a coil that generates a magnetic flux, which flows through the plunger and the stator, when the coil is energized; and
a stopper that is opposed to the core in the axial direction while the plunger receiving chamber is interposed between the stopper and the core, wherein the stopper limits movement of the plunger toward a side in the axial direction, wherein:
a magnetic circuit, which includes the plunger and the stator, is formed to magnetically attract the plunger toward the core when the coil is energized;
the plunger receiving chamber includes a volume variable chamber that is formed between the plunger and the stopper;
the stopper includes:
  a partition wall that partitions between an inside and an outside of the volume variable chamber; and
  a breathing passage that extends through the partition wall of the stopper and communicates between the inside and the outside of the volume variable chamber;
a region adjacent to the breathing passage or at least a portion of the breathing passage is formed in a magnetism application region, wherein a leakage magnetic flux, which is leaked from the magnetic circuit, passes through the magnetism application region.

2. The solenoid according to claim 1, wherein the magnetism application region is immersed at least together with the stopper into fluid.

3. The solenoid according to claim 1, wherein:
the stopper includes a fluid flow guide portion that guides fluid into the volume variable chamber through the breathing passage when a volume of the volume variable chamber is increased in response to movement of the plunger; and
the fluid flow guide portion directs a flow direction of the fluid, which flows from an outside of the solenoid into the breathing passage, toward the magnetism application region and also directs a flow direction of the fluid, which flows from the breathing passage to the outside of the solenoid, toward the magnetism application region.

4. The solenoid according to claim 1, wherein:
the stopper includes a fluid flow guide portion that guides fluid into the volume variable chamber through the breathing passage when a volume of the volume variable chamber is increased in response to movement of the plunger;
a breathing hole of the breathing passage extends through the partition wall of the stopper in the axial direction;
the fluid flow guide portion extends outwardly from the breathing hole of the breathing passage in a radial direction of a central axis of the solenoid and opens to an outside of the solenoid in the radial direction;
a radially outer end of the fluid flow guide portion is located on a radially outer side of a radially outermost part of the breathing hole that is furthermost from the central axis of the solenoid in the radial direction; and
when the fluid flows from the outside of the solenoid into the breathing passage, the flow guide portion directs a flow of the fluid in the radial direction to pass along at least a portion of the magnetism application region and then directs the flow of the fluid in the axial direction at a location that is on a radially inner side of the magnetism application region.

5. The solenoid according to claim 4, wherein the magnetism application region is located on a radially outer side of the breathing hole of the breathing passage in the radial direction on the partition wall of the stopper.

6. The solenoid according to claim 4, wherein:
when energization of the coil is turned on, the leakage magnetic flux passes through the magnetism application region and exerts a magnetism in the magnetism application region to magnetically attract and capture a magnetic foreign object at a corresponding portion of the partition wall of the stopper in the magnetism application region; and
when the energization of the coil is turned off, the leakage magnetic flux is lost to release the magnetic foreign object from the corresponding portion of the partition wall of the stopper.

7. The solenoid according to claim 1, wherein the breathing passage includes a plurality of breathing holes, which are arranged one after another at predetermined intervals along a circle that is centered at a central axis of the solenoid.

8. The solenoid according to claim 1, wherein:
the partition wall of the stopper is made of a non-magnetic material and includes a planar partition wall, through which a breathing hole of the breathing passage extends in the axial direction, and a projecting partition wall, which projects from the planar partition wall in the axial direction on an opposite side of the planar partition wall that is opposite from the plunger in the axial direction;
the projecting partition wall is located on a radially inner side of the breathing hole in a radial direction of a central axis of the solenoid; and
the projecting partition wall includes a guide wall that outwardly extends in the radial direction to a location, which is on a radially outer side of a radially innermost part of the breathing hole that is closest to the central axis of the solenoid in the radial direction, to oppose at least a portion of the breathing hole in the axial direction.

9. The solenoid according to claim 8, wherein a radial location of a radially outer end of the guide wall coincides with a radial location of a radially outermost part of the breathing hole that is furthermost from the central axis of the solenoid in the radial direction.

10. The solenoid according to claim 8, wherein the magnetism application region is located on a radially outer side of the breathing hole in the radial direction on the planar partition wall.

11. The solenoid according to claim 8, wherein the breathing hole is one of a plurality of breathing holes of the breathing passage formed to extend through the planar partition wall in the axial direction.

12. The solenoid according to claim 8, wherein:
when energization of the coil is turned on, the leakage magnetic flux passes through the magnetism application region and exerts a magnetism in the magnetism application region to magnetically attract and capture a magnetic foreign object at a corresponding portion of the planar partition wall in the magnetism application region; and
when the energization of the coil is turned off, the leakage magnetic flux is lost to release the magnetic foreign object from the corresponding portion of the planar partition wall.

13. A hydraulic pressure control apparatus comprising:
an oil pan that stores oil used in an automatic transmission;
a valve body that is placed in an inside of the oil pan and includes a plurality of flow passages; and
a plurality of solenoid valves that form a hydraulic circuit in cooperation with the plurality of flow passages of the valve body, wherein at least one of the plurality of solenoid valves includes the solenoid of claim 1.

14. The hydraulic pressure control apparatus according to claim 13, wherein the at least one of the plurality of solenoid valves is immersed together with the valve body into the oil.

15. The hydraulic pressure control apparatus according to claim 13, wherein the at least one of the plurality of solenoid valves includes:
a housing that is installed to the valve body and includes a plurality of oil supply and discharge ports, through which the oil inflows into or outflows from the housing;
a shaft that is coaxial with the plunger and is reciprocatably and slidably supported by the housing; and
a valve element that is connected to the shaft to move integrally with the shaft.

16. The hydraulic pressure control apparatus according to claim 15, wherein:
the solenoid forms a solenoid actuator that drives the valve element through the shaft; and
the valve element is driven toward one end side, which is opposite from the breathing passage, when the coil is energized.

\* \* \* \* \*